United States Patent
Hakala et al.

[11] Patent Number: 5,090,846
[45] Date of Patent: Feb. 25, 1992

[54] METHOD AND APPARATUS FOR DRILLING OF HOLES INTO THE MANTLE OF A CYLINDER

[75] Inventors: Jaakko Hakala, Korpilahti; Eero Savolainen, Jyväskylä, both of Finland

[73] Assignee: Valmet Paper Machinery Inc., Finland

[21] Appl. No.: 667,825

[22] Filed: Mar. 12, 1991

[30] Foreign Application Priority Data

Mar. 19, 1990 [FI] Finland ................... 901367

[51] Int. Cl.⁵ .................. B23B 35/00; B23B 41/00
[52] U.S. Cl. .................. 408/1 R; 408/51; 408/92; 408/95
[58] Field of Search ............. 408/1 R, 42, 51, 53, 408/92, 95, 97

[56] References Cited

U.S. PATENT DOCUMENTS

| | | | |
|---|---|---|---|
| 780,799 | 1/1905 | Kabaker | 408/51 |
| 1,399,073 | 12/1921 | Pahmeyer et al. | 408/52 |
| 1,559,359 | 10/1925 | Pahmeyer | 408/79 |
| 1,854,053 | 4/1932 | Millspaugh | 408/52 |
| 2,506,202 | 5/1950 | Folkerth, Sr. | 408/42 |
| 4,674,925 | 6/1987 | Thornton et al. | 408/53 |

FOREIGN PATENT DOCUMENTS 137814 10/1980 Japan .................. 408/42

*Primary Examiner*—Daniel W. Howell
*Attorney, Agent, or Firm*—Steinberg & Raskin

[57] ABSTRACT

A method and apparatus for drilling holes into the mantle of a cylinder in a paper machine while the cylinder is in its place of operation in a paper machine is disclosed. After each cycle of drilling, a multi-spindle drilling machine is transferred along guide rails supported against a cylinder adjacent to the cylinder to be machined. Prior to drilling, the drill equipment is tensioned between the mantle face of the cylinder to be machined and the mantle face of the adjacent cylinder.

11 Claims, 7 Drawing Sheets

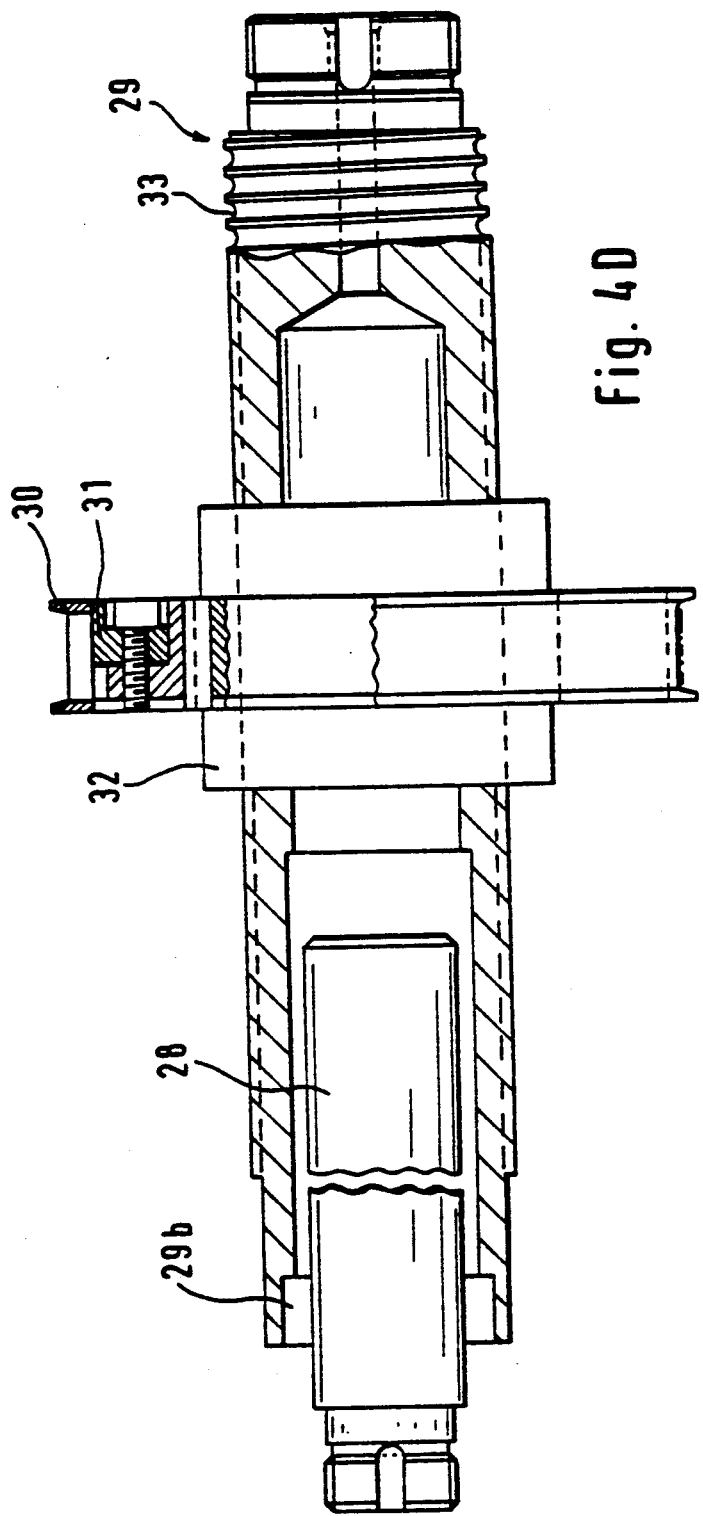

METHOD AND APPARATUS FOR DRILLING OF HOLES INTO THE MANTLE OF A CYLINDER

FIELD OF THE INVENTION

The invention concerns a method and a device for perforation of the mantle of a cylinder in a paper machine, in particular of the mantle of a drying cylinder, on the site without detaching the cylinder from its place of operation.

BACKGROUND OF THE INVENTION

In operations of modification of the cylinders in a drying group in a paper machine, the drying cylinder has been removed from its place and carried aside for machining. At present, ordinary non-perforated cylinders in a drying group are converted to so-called UNO-VAC® cylinders by perforating the cylinder mantle. In prior art, the perforation had to be carried out at a separate machining point either at the paper mill or in a workshop specialized in the conditioning of cylinders.

SUMMARY OF THE INVENTION

The object of the present invention is to eliminate the above-described costly and time-consuming transfer of a cylinder to a separate machining point.

The method of the present invention relates to an arrangement wherein a drilling machine is transferred along guide rails supported against the cylinder adjacent to the cylinder to be machined. Before the drilling (machining) is started, the drill equipment is tensioned between the mantle face of the cylinder to be machined and the mantle face of the adjacent cylinder by displacing the drill guide into contact with the cylinder face to be machined. The drilling machine is then transferred to the next drilling site along the guide rails.

The apparatus of the present invention relates to a spindle box of a multi-spindle drilling machine, which box contains a unit of rotation for the drill bits and related power transmission means for simultaneous transfer of the rotation to all of the drill bits placed side by side. The apparatus further comprises a cylinder, by whose means the jig of the drill bits, i.e. the drill guide, is controlled into contact with the face to be machined. As the equipment is supported both on the cylinder that is being machined and on the adjacent other cylinder constituting a support base for the guides, a unified strong structure is formed during the drilling process to permit substantially undisturbed and vibration-free drilling.

The drive motor is fitted to displace the spindle box relative the main frame of the drill equipment when drill bits disposed within the spindle box are passed towards the cylinder face to be machined. The drill bits are fitted to be rotated by a drive motor. A drill guide is used such that the drill equipment can be supported and tensioned between the guides and the mantle face of the cylinder to be machined, whereby the machining process becomes free from vibrations. Slide bushings or the equivalent guide the main frame of the drill equipment in a guide when the equipment is being transferred in the direction of the longitudinal axis of the cylinder as the equipment is shifted to the following drilling position.

BRIEF DESCRIPTION OF THE DRAWINGS

The invention will be described in the following with reference to some preferred embodiments of the invention illustrated in the figures in the accompanying drawings, the invention being, however, not being confined to said embodiments alone.

FIGS. 4A-4D illustrate the arrangement of equipment employed for displacing the spindle box and the drill guide.

DETAILED DESCRIPTION OF THE PREFERRED EMBODIMENTS

Figure 1:
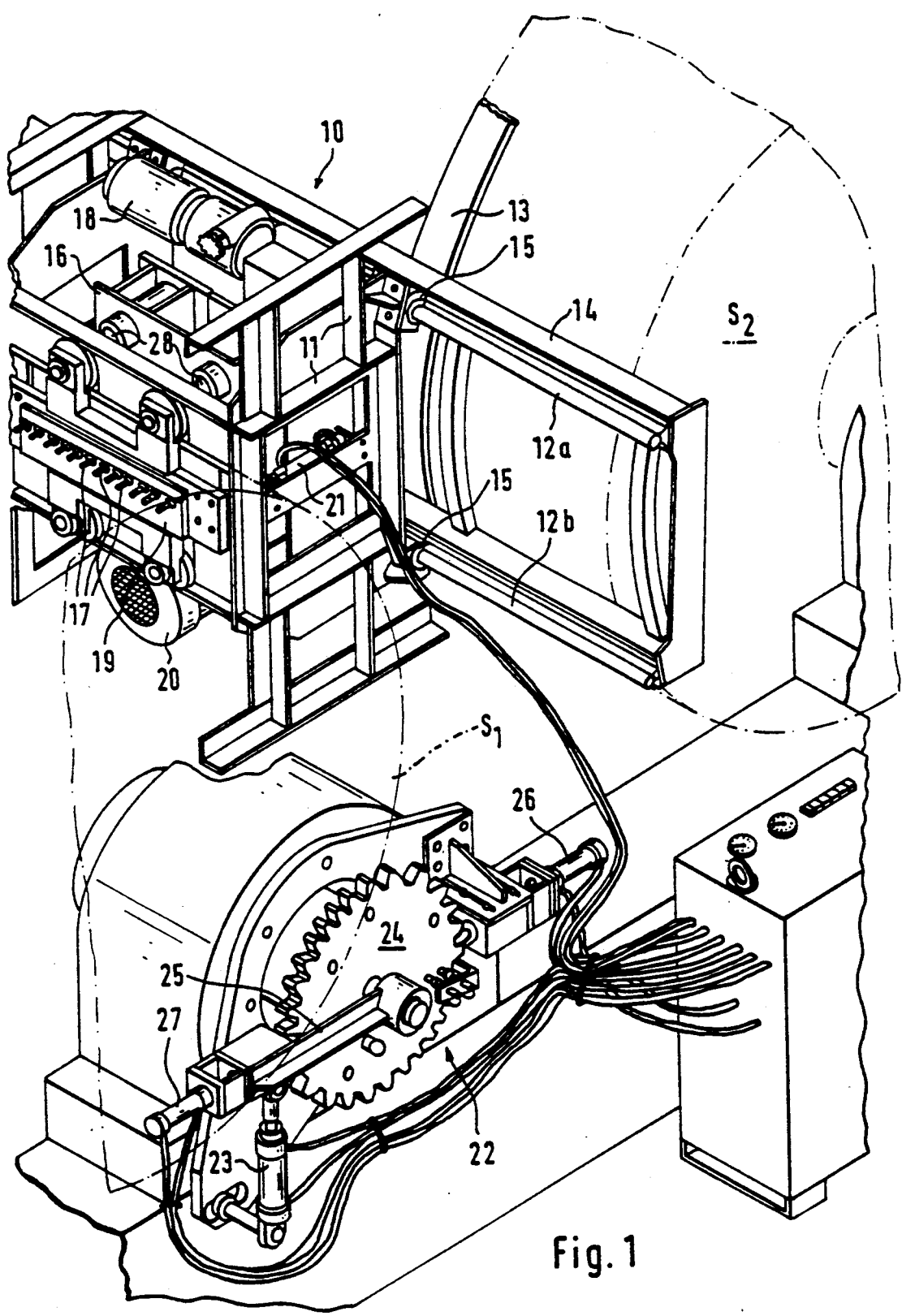
FIG. 1 is an axonometric illustration of a preferred embodiment of the method and the device in accordance with the invention.

FIG. 1 is an axonometric view of a preferred embodiment of the device in accordance with the invention in its machining location between two adjacent cylinders $S_1$ and $S_2$ of a paper machine. The equipment 10 comprises a basic frame 11, which is supported on guides 12 supported and fixed on the cylinder $S_2$ on the cylinder mantle. The guides 12a and 12b are connected with the frame part 14, which is further supported on the face of the cylinder $S_2$ by means of fastening belts 13 (one belt is shown in the figure). The belts 13 are passed around the cylinder. The guides 12a and 12b pass in the axial direction of the cylinder over the width of the mantle of the cylinder.

The basic frame 11 of the drilling equipment 10 comprises slide bushings 15, on whose support the basic frame 11 is displaced in the axial direction of the cylinder manually after each drilling cycle.

The drilling equipment 10 in accordance with the invention comprises a spindle box 16, to which the motor 18 of rotation of the drill bits 17 is attached. In the embodiment shown in FIG. 1, the motor 18 of rotation is fitted to rotate twelve drill bits 17 placed side by side in a row at the same time. The spindle box further comprises a motor 20 attached to the box, by means of which motor the spindle box 16 and the drill bits 17 placed in it are displaced so as to produce the feed movement of the drill bits 17 and to move the drill bits apart from the roll mantle to be drilled after the drilling.

Before the drilling is started, the drill guide 19 is brought into contact with the mantle face to be machined by displacing the drill guide 19 by means of its actuator 21, preferably a cylinder device, into contact with the cylinder face. Thus, for the time of the drilling, the drill equipment 10 is supported both on the cylinder $S_1$ to be machined and on the adjacent cylinder $S_2$. Thus, when the drill guide 19 is tensioned against the face to be machined by means of the actuator 21, the overall construction becomes rigid. Precise drilling can be accomplished as the vibrations during the machining are minimized.

In FIG. 1, the reference numeral 22 denotes the equipment of rotation of the cylinder to be machined. The equipment 22 of rotation comprises a cogwheel 24 and a lever 25 of rotation connected to the axle of the cylinder $S_1$. On completion of its working stroke, the lifting cylinder 23 shifts the lever 25 upwards and rotates the cylinder $S_1$ to be machined to the next working step after the preceding row has been drilled. The movement of rotation corresponds to one tooth gap, and the cylinder is locked by means of a locking cylinder 26, 27 in a fixed position for the time of the machining.

Figure 2:
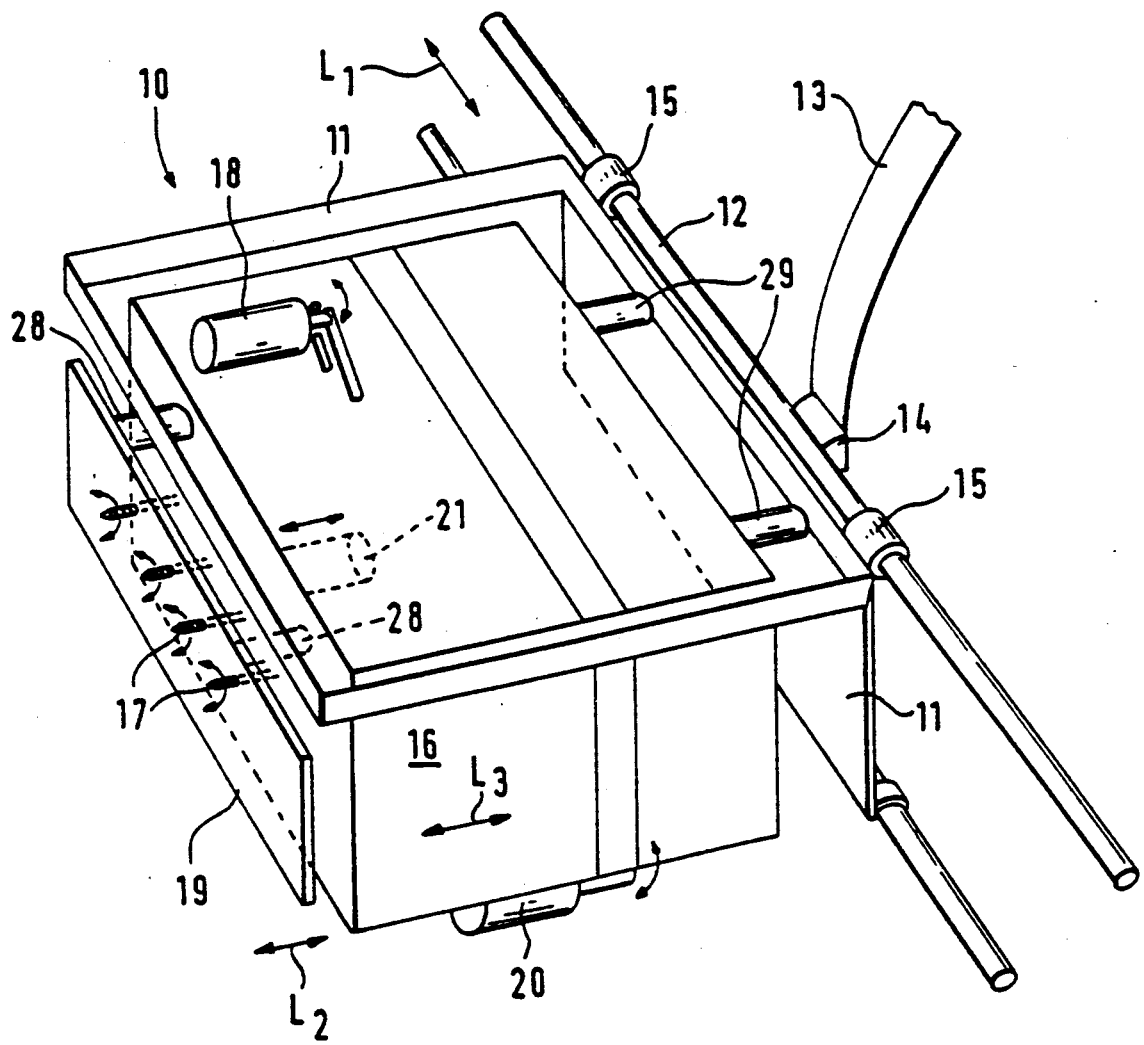
FIG. 2 is a schematic illustration of the main components of the device in accordance with the invention.

FIG. 2 is a schematic illustration of the main components of the drilling equipment 10 in accordance with the invention. The drill equipment 10 comprises a basic (or main) frame 11. The basic frame 11 is supported on the guides 12 by means of slide bushings 15 connected to the basic frame 11. The guides 12 are connected to the frame part 14, which frame part 14 is attached by means of a fastening belt 13 to the cylinder adjacent to the cylinder to be machined. The spindle box 16 is displaced in relation to the basic frame 11 by means of a motor 20 of displacement of the spindle box. The spindle box 16 comprises a number of drill bits 17 placed side by side, said drill bits being rotated by means of a rotation motor 18. The motors 18 and 20 of rotation are placed in fixed positions in the spindle box 16.

The drill guide 19 is displaced in relation to the spindle box 16 as guided by separate guide shafts 28, and the displacing of the drill guide 19 is produced by means of an actuator 21, preferably a cylinder device placed inside the spindle box 16. By operating the cylinder device 21, the drill guide 19 is displaced into contact with the roll mantle to be machined while the guide shafts 28 glide in the guide bushings 29b in the ends of the guide shafts 29 of the spindle box 16.

The drilling process is as follows. The drill equipment 10 is fixed to the cylinder $S_2$ adjacent to the cylinder $S_1$ to be machined by means of fastening belts 13 (in the figure, one belt 13 is shown) The equipment 10 is displaced (arrow $L_1$) into the drilling position along the guides 12. By means of the cylinder device 21, the jig, i.e. the drill guide 19, is displaced into contact with the face of the cylinder to be machined (arrow $L_2$). The spindle box 16 with the drill bits 17 is displaced by means of the motor 20 towards the cylinder $S_1$ to be machined (arrow $L_3$). The spindle box 16 is guided by the shafts 29. The rotation of the drill bits 17 is switched on, i.e. the motor 18 is switched on.

Upon completion of drilling, the sequence of operations is reversed, and the drill equipment 10 is shifted to a new drilling position along the guides 12, being guided by the slide bushings 15.

Figure 3A:
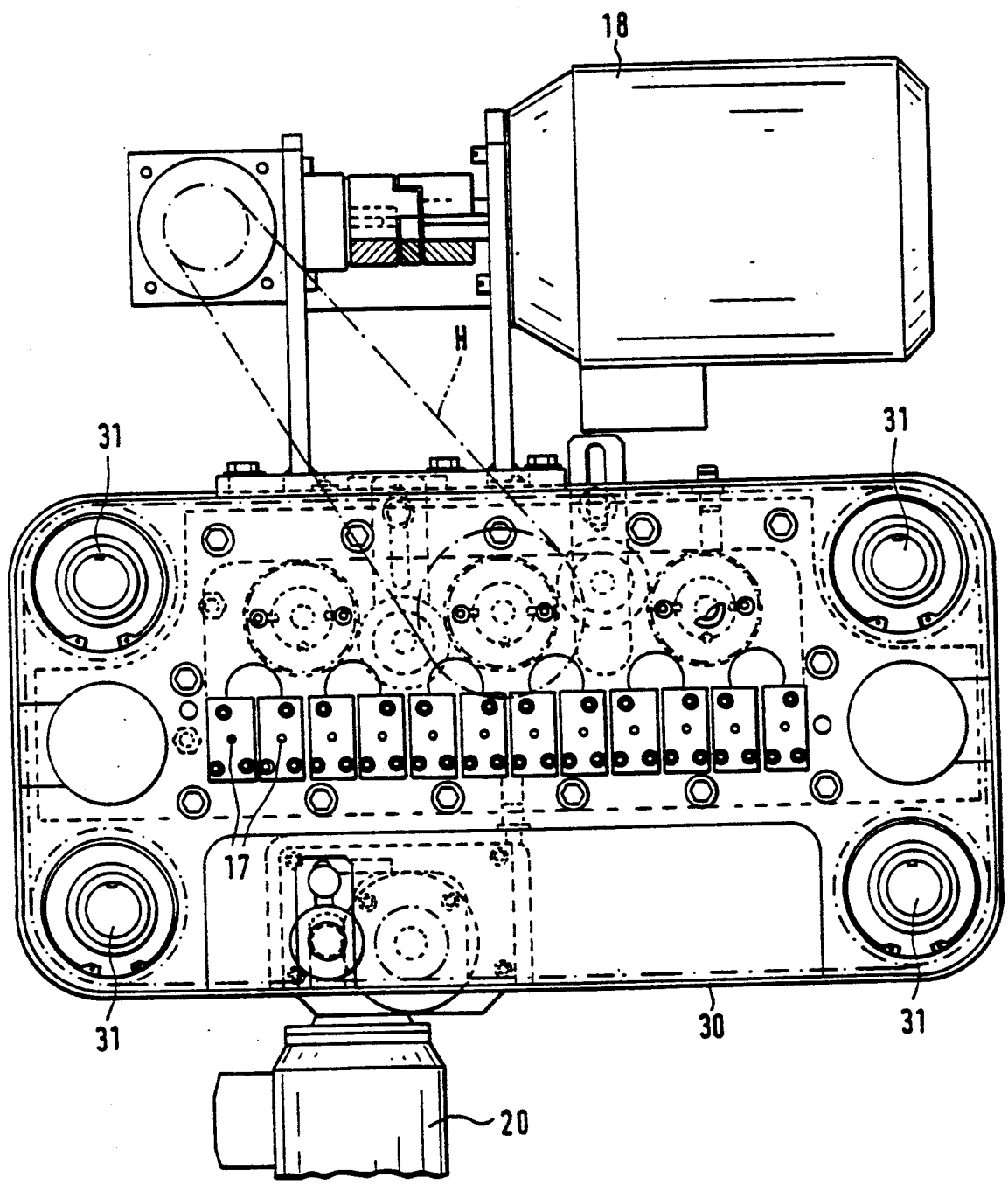
FIG. 3A is a schematic illustration of the equipment of rotation of the drill bits placed side by side.

FIG. 3A shows the rotation drive of the drill bits. What is shown is merely the spindle box with the drill guide removed. From the output shaft of the rotation motor 18, the rotation is transferred by means of a belt transmission H to the set of drive wheels of the drill bits in the spindle box, first to the first driven shaft, from whose cogwheel the rotation is distributed further to the drill bits 17.

Figure 3B:
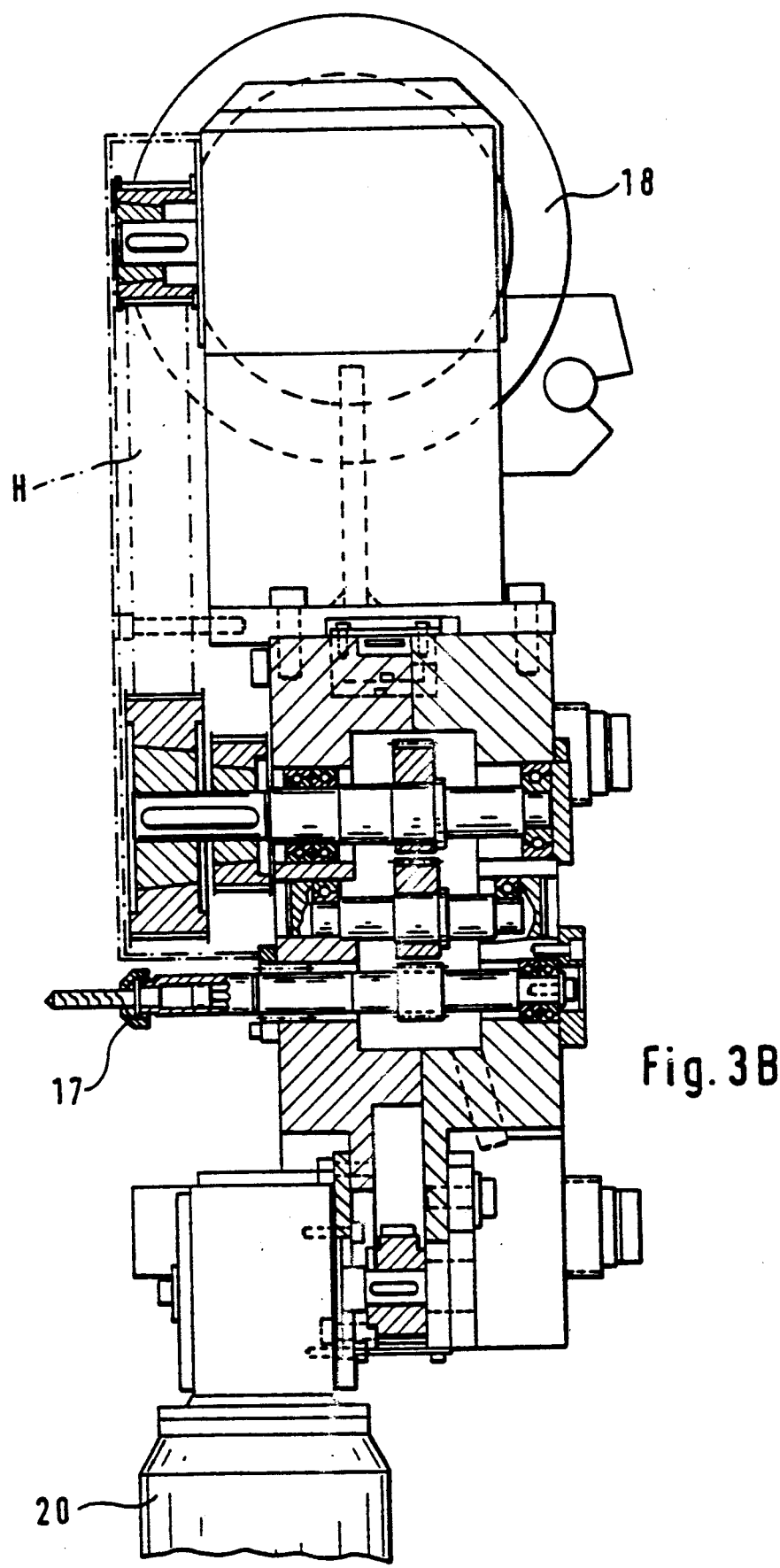
FIG. 3B is a sectional view taken along the line I—I in FIG. 3A.

FIG. 3B is a sectional view taken along the line I—I in FIG. 3A.

In FIG. 3A, further, the arrangement of displacement of the spindle box 16 in accordance with the invention is shown. The motor 20 of displacement of the spindle box 16 rotates a cogged belt 30. The cogged belt is passed over four separate belt pulleys 31, and each pulley 31 for the cogged belt is journalled to revolve on bearing means 34 in relation to the spindle box 16.

Figure 4A:
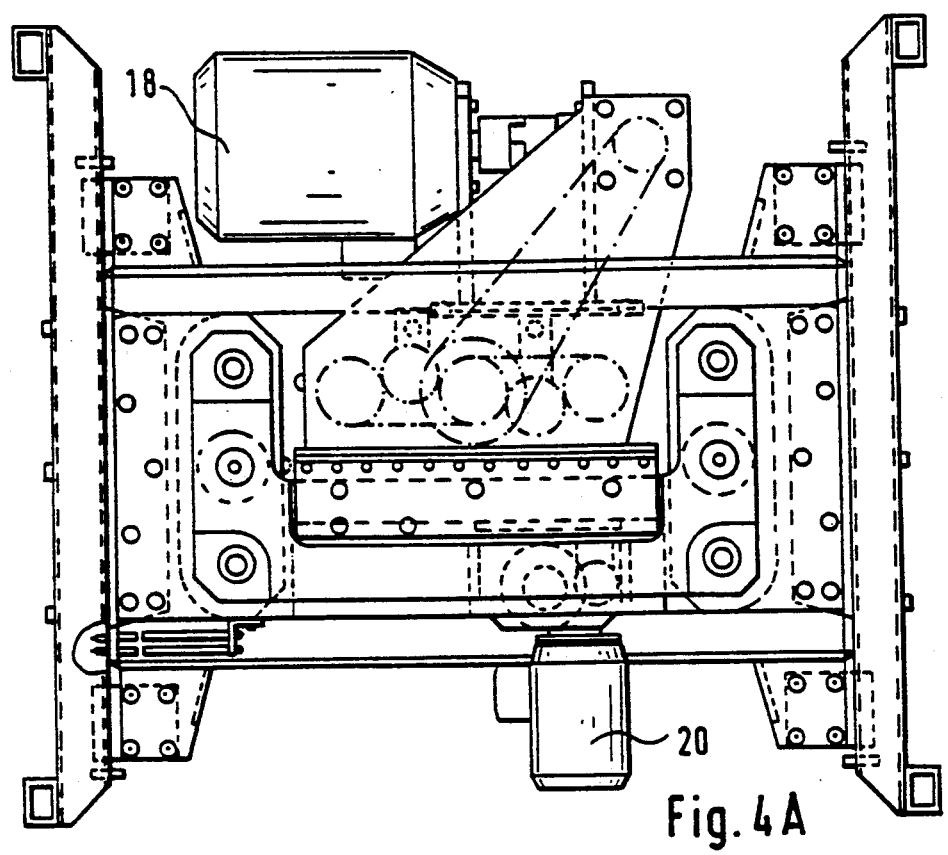
Figure 4B:
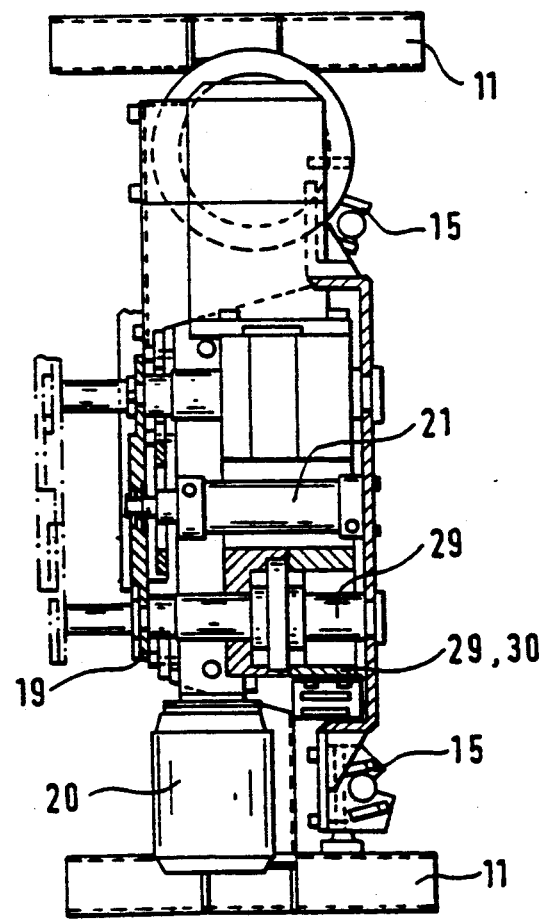
Figure 4C:
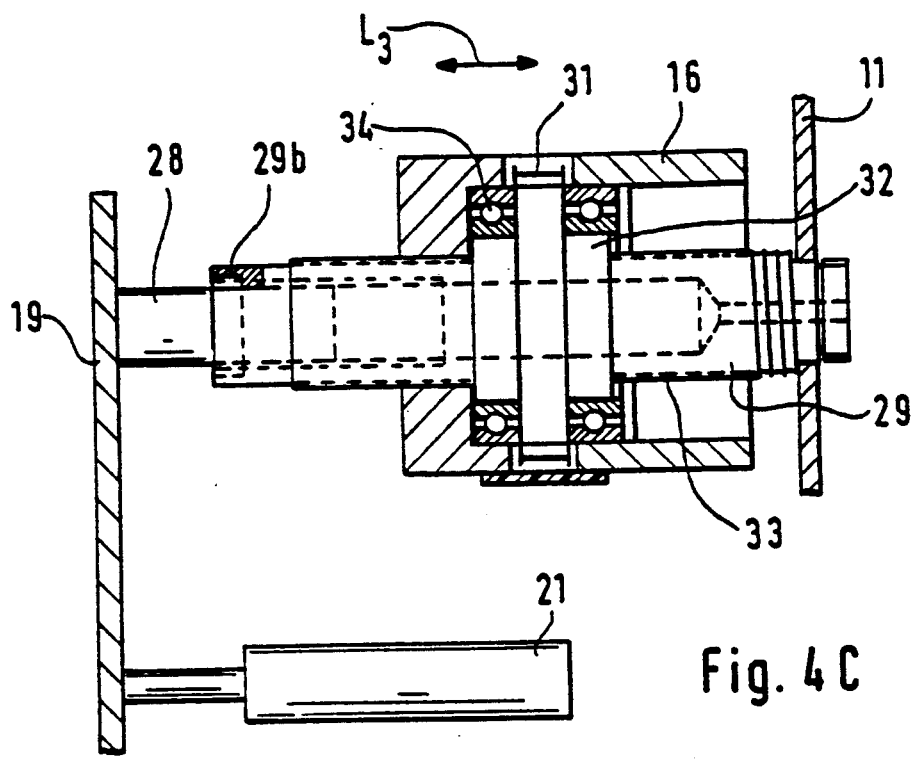

FIGS. 4A-4C are more detailed illustrations of the arrangement of displacement of the drill guide 19 in the spindle box 16. FIG. 4A shows the frame construction of the whole device as viewed from the front. FIG. 4B is a partial sectional view of the solution of equipment. The drill guide and the guide of the spindle box are shown. FIG. 4C is an illustration of principle of the ball-nut drive of the spindle box. FIG. 4D is a more detailed illustration of the solution shown in FIG. 4C.

FIG. 4A is a front view of the frame construction of the drill device. In FIG. 4B, the construction of FIG. 4A is shown as a side view and partly in section. The frame 11 is guided on support of the bushings 15 in guides, which are further attached to the cylinder adjacent to the cylinder to be machined. From FIG. 3A it can been seen that the spindle box comprises cogged-belt pulleys 31 in the four corners of the box 16, the cogged belt 30 being passed over the pulleys. The motor 20 operates the cogged belt and thereby the cogged-belt pulleys 31. Also, in the solution of FIG. 4B, the actuator 21 is shown by whose means the drill guide 19 is displaced into the position indicated by the dashed-dotted line in FIG. 4B.

FIG. 4C is a more detailed illustration of the displacing of the spindle box and of the arrangement of displacing of the drill guide. Each cogged-belt pulley 31 comprises an inside ball nut 32. Thus, by means of the cogged belt 30, the cogged-belt pulleys 31 and the related ball nuts 32 are rotated. Through the ball nut 32, a ball screw 33 has been passed, which has been made onto the guide shaft 29 and which is jointly operative with the ball nut. The ball screw 33 is attached permanently to the basic frame 11. The ball nut 32 is journalled on the spindle box 16 by means of bearings 34. Thus, when the motor 20 for displacement of the spindle box 16 is rotated, the cogged belt 30 is operated and, further, the cogged-belt pulleys 31 are rotated and the spindle box 16 and the related means, such as the drill bits 17, are displaced in the way shown by the arrow $L_3$ towards the cylinder to be machined.

Before the drilling is started, the drill guide 19 has been displaced by means of the actuator 22 into contact with the cylinder face to be machined. The drill guide 19 is shifted on support of the guide shafts 28, being guided by the guide bushings 29b of the guide shaft 29 of the spindle box 16, into an accurate position in relation to the cylinder to be machined.

Upon completion of the drilling, the sense of rotation of the motor 20 for displacement of the spindle box is reversed and the spindle box 16 with the related drill bits 17 is shifted out of contact with the cylinder to be machined.

FIG. 4D is a still more detailed illustration of the solution of FIG. 4C in respect of the system of displacement of the spindle box 16 and of the guide shaft 28 of the drill guide. The cogged belt 30 is passed over the cogged-belt pulley 31. The ball nut 32 is attached to the cogged-belt pulley, which nut 32 is further jointly operative with the ball screw 33 on the spindle-box guide shaft 29. The ball nut 32 is journalled to revolve in relation t the spindle box 16 on the bearings 34 (shown in FIG. 4C). The guide shaft 28 of the drill guide 19 glides in the guide bushing 29b fitted in the hollow end space in the shaft 29. When the belt 30 is operated, the nut 32 is rotated and thereby the spindle box 16, which is mounted in a fixed position in relation to the nut, is displaced in the direction determined by the operation of the belt 30, either towards the cylinder to be machined or away from said cylinder.

Figure 5:
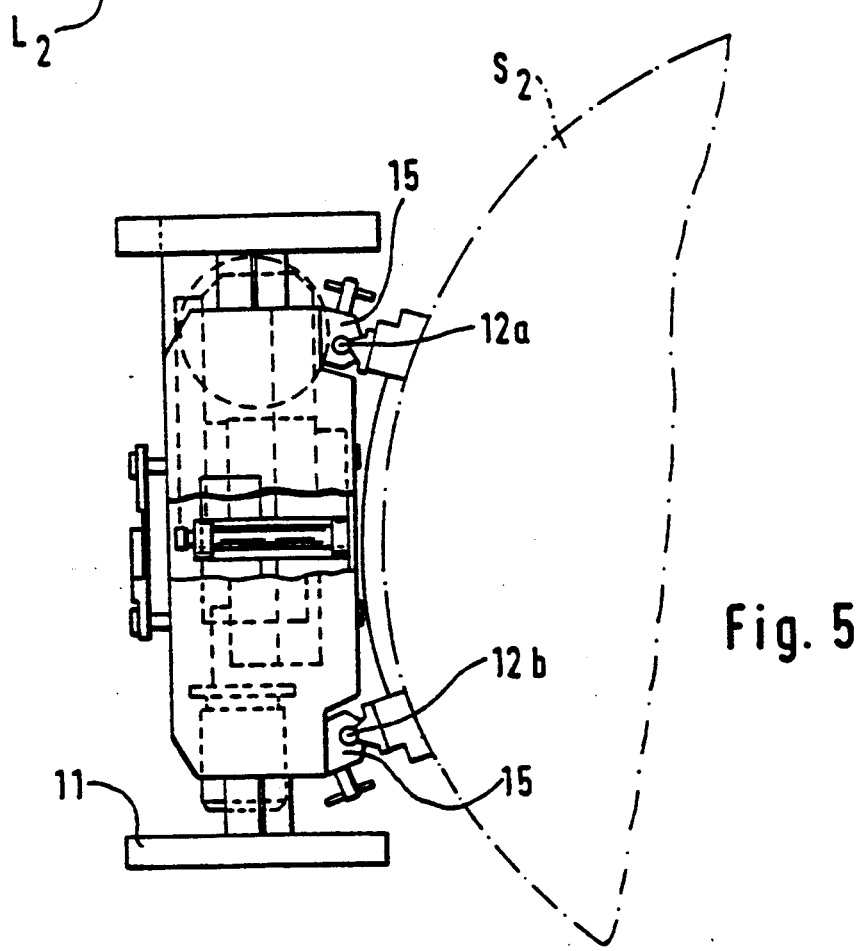
FIG. 5 illustrates the support of the main frame of the device on two guide bars.

FIG. 5 shows the attaching of the drilling equipment 11 on the cylinder $S_2$ on support of the guides 12a and 12b fitted on the cylinder $S_2$.

The examples of the preferred embodiments provided above are not meant to be exclusive. Many other variations of the present invention would be obvious to those skilled in the art, and are contemplated to be within the scope of the appended claims.

What Is Claimed Is:

1. A method of drilling holes into the mantle of a cylinder in a paper machine while the cylinder is in its place of operation in the paper machine, comprising
    transferring drilling equipment comprising a multi-spindle drilling machine along guide rails to a desired site in proximity to a first cylinder to be machined without detaching said first cylinder from its place of operation, said drilling equipment being fitted to be supported during the drilling process both on the mantle face of said first cylinder and on the mantle face of a second cylinder which is adjacent said first cylinder,
    supporting said guide rails against said second cylinder,
    tensioning said drilling equipment between said mantle face of said first cylinder and said mantle face of said second cylinder to drilling, and
    displacing a drill guide into contact with said first cylinder.

2. The method of claim 1, wherein said a multi-spindle drilling machine comprises a spindle box having a plurality of machining drill bits and said spindle box is guided in guide shafts in a main frame of said drilling equipment, the method further comprising displacing said spindle box by means of an actuator so as to produce a feed movement of said drill bits during drilling and so as to move said drill bits away from said mantle face of said first cylinder after drilling is completed.

3. The method of claim 2, further comprising producing said feed movement of said drill bits via a mechanism of ball screws attached to said main frame and ball nuts journalled to said spindle box, said ball screws being jointly operative with said ball nuts, and rotating said actuator such that a cogged belt operated by said actuator and to which said ball nuts are engaged causes said feed movement of said drill bits via said mechanism of ball screws and ball nuts.

4. The method of claim 3, further comprising, simultaneously drilling a plurality of drill holes in said mantle face of said first cylinder.

5. The method of claim 1, further comprising
    transferring said drilling equipment to a new drilling position along said guide rails in the direction of the longitudinal axis of said first cylinder upon completion of drilling said first cylinder.

6. The method of claim 1, further comprising drilling a first set of holes in said mantle face of said first cylinder, and thereafter rotating said first cylinder over a predetermined angle, and drilling a second row of holes in said mantle face of said first cylinder.

7. An apparatus for drilling holes into a mantle of a cylinder in a paper machine, comprising
    drilling equipment comprising a main frame and a drilling machine,
    guide means for guiding said main frame along a longitudinal axis of the mantle face of a cylinder to be machined as said drilling equipment is moved into a drilling position while said cylinder is maintained in its place of operation in a paper machine,
    a drill guide for supporting and tensioning said drill equipment between said guide means and the mantle face of the cylinder to be machined,
    said drilling machine comprising a spindle box having a plurality of drill bits, said drill bits adapted to be rotated by a first drive means, said spindle box comprising a second drive means fitted to displace said spindle box relative to said mainframe when said drill bits are moved toward a mantle face of a cylinder to be machined,
    said drill bits producing drill holes in the mantle face of said cylinder without said cylinder being detached from its place of operation during the drilling process, said drilling equipment being substantially free from vibration during the drilling process, and
    further comprising a fastening belt upon which said guide means are supported, said fastening belt adapted to be fastened onto a cylinder adjacent to the cylinder to be machined such that said drilling equipment can be tensioned between the cylinder to be machined and the adjacent cylinder during the drilling process.

8. The apparatus of claim 7, further comprising an actuator for displacing said drill guide so as to bring said drill guide into contact with the mantle face of the cylinder to be machining during the drilling process.

9. The apparatus of claim 7, wherein said spindle box further comprises
    a cogged belt operated by said second drive means,
    at least one cogged-belt pulley in which a ball nut is fitted, said cogged belt being passed over said cogged-belt pulley,
    a spindle box guide shaft for displacing said drill guide into an accurate position relative to the cylinder to be machined, said spindle box guide shaft including a ball screw jointly operative with said ball nut, said second drive means acting on said cogged belt such that said cogged-belt pulleys are rotated and said spindle box is displaced toward and away from the mantle face of the cylinder to be machined.

10. The apparatus of claim 9, wherein said ball nut is fitted to revolve in a bearing means installed in said spindle box, said ball screw being machined onto a face of said spindle box guide shaft and being in a fixed position relative to said spindle box, said spindle box being transferred on said ball screw when said cogged belt is acted on by said second drive means.

11. The apparatus of claim 10, wherein said drill guide comprises a drill guide shaft which has been passed into a central hollow space of said spindle box guide shaft and is guided and supported in said space by means of a guide bushing.

* * * * *